US008223360B2

(12) United States Patent
Yamanaka

(10) Patent No.: US 8,223,360 B2
(45) Date of Patent: Jul. 17, 2012

(54) IMAGE DATA PROCESSING SYSTEM, CONTROL APPARATUS, IMAGE CONVERTING PROGRAM AND METHOD

(75) Inventor: Tsuyoshi Yamanaka, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1577 days.

(21) Appl. No.: 11/478,357

(22) Filed: Jun. 30, 2006

(65) Prior Publication Data
US 2007/0014538 A1 Jan. 18, 2007

(30) Foreign Application Priority Data

Jun. 30, 2005 (JP) ................ P2005-191956

(51) Int. Cl.
G06F 3/12 (2006.01)
(52) U.S. Cl. ....... 358/1.15; 358/1.9; 358/1.16; 709/203; 715/710; 714/748
(58) Field of Classification Search .......... 358/1.9, 358/1.15, 1.16; 715/710; 714/748; 709/203
See application file for complete search history.

(56) References Cited

U.S. PATENT DOCUMENTS

| 6,825,944 | B1 * | 11/2004 | Noda | 358/1.15 |
| 6,950,197 | B1 * | 9/2005 | Nakajima | 358/1.1 |
| 2001/0052998 | A1 * | 12/2001 | Kiyosu et al. | 358/1.15 |
| 2002/0118385 | A1 * | 8/2002 | Nagashima | 358/1.15 |

FOREIGN PATENT DOCUMENTS

| JP | 2000-155653 | A | 6/2000 |
| JP | 2001-243138 | | 9/2001 |
| JP | 2002-329197 | | 11/2002 |
| JP | 2004-032255 | | 1/2004 |
| JP | 2004-74696 | A | 3/2004 |
| JP | 2004-234169 | A | 8/2004 |

OTHER PUBLICATIONS

Japanese Office Action, with English Translation, issued in Japanese Patent Application No. 2005-191956, dated on Feb. 26, 2008.

* cited by examiner

Primary Examiner — King Poon
Assistant Examiner — Jamares Q Washington
(74) Attorney, Agent, or Firm — Baker Botts L.L.P.

(57) ABSTRACT

An image data processing system comprises: a first storing unit that previously stores an apparatus information corresponding to an image recording apparatus; a determining unit that determines whether or not the apparatus information stored in the first storing unit is in a predetermined range of values; a notifying unit that notifies whether or not a content of the apparatus information is normal based on a result determined by the determining unit; an instruction acquiring unit that acquires an instruction indicating whether or not an image data is converted by using the apparatus information stored in the first storing unit; a converting unit that converts an image data based on the instruction; and an image data supplying unit that supplies the image data to the image recording apparatus corresponding to the apparatus information.

10 Claims, 5 Drawing Sheets

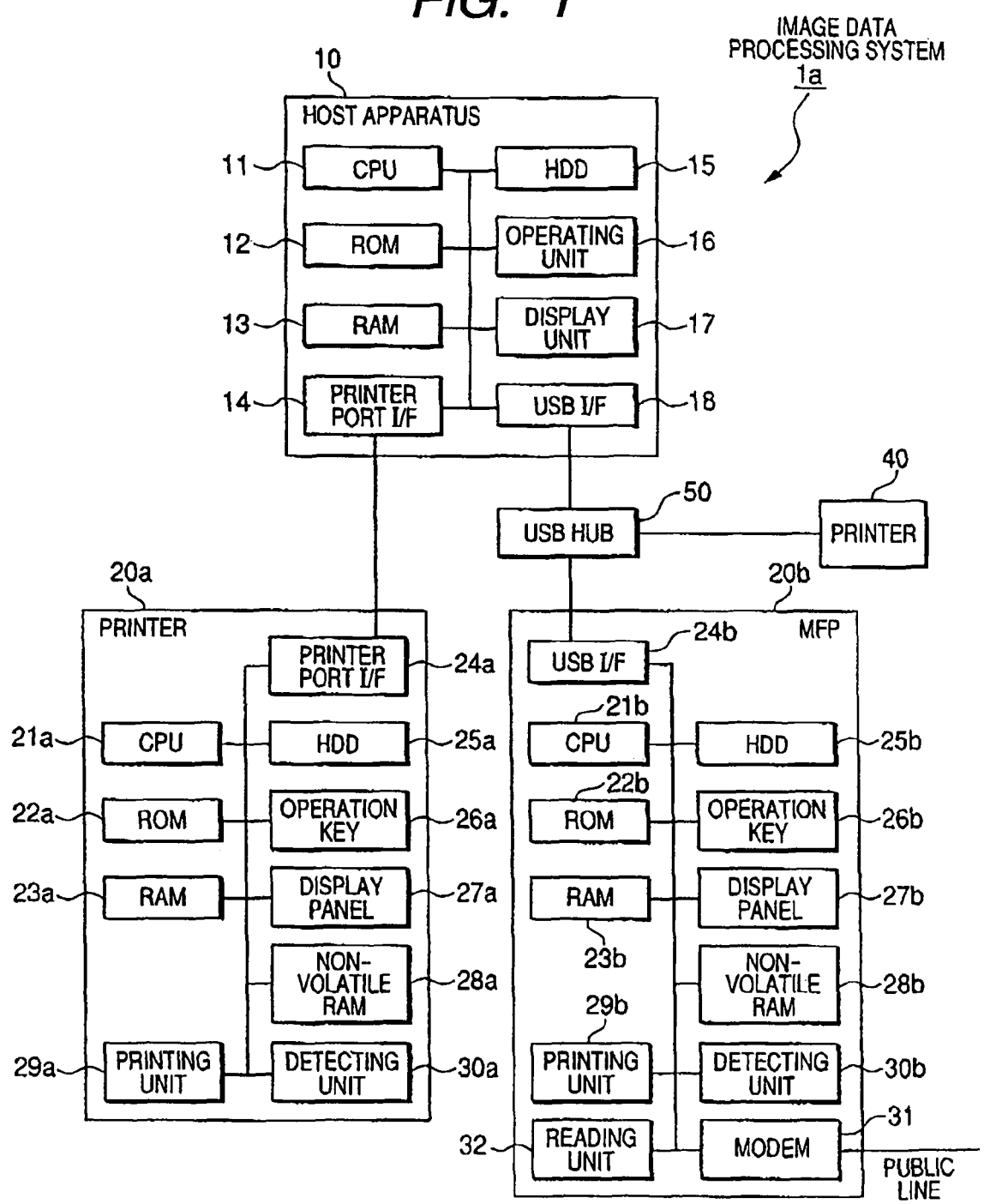

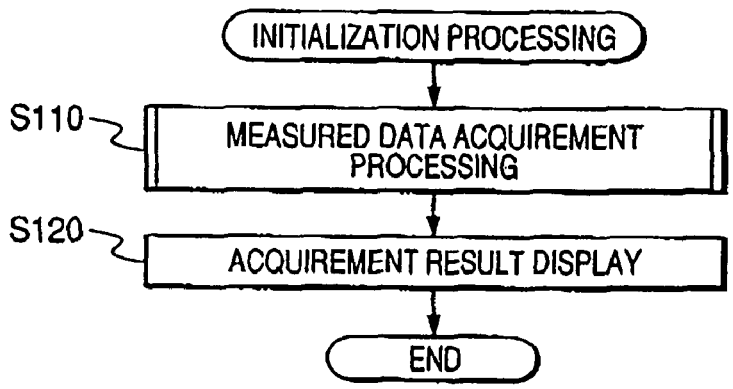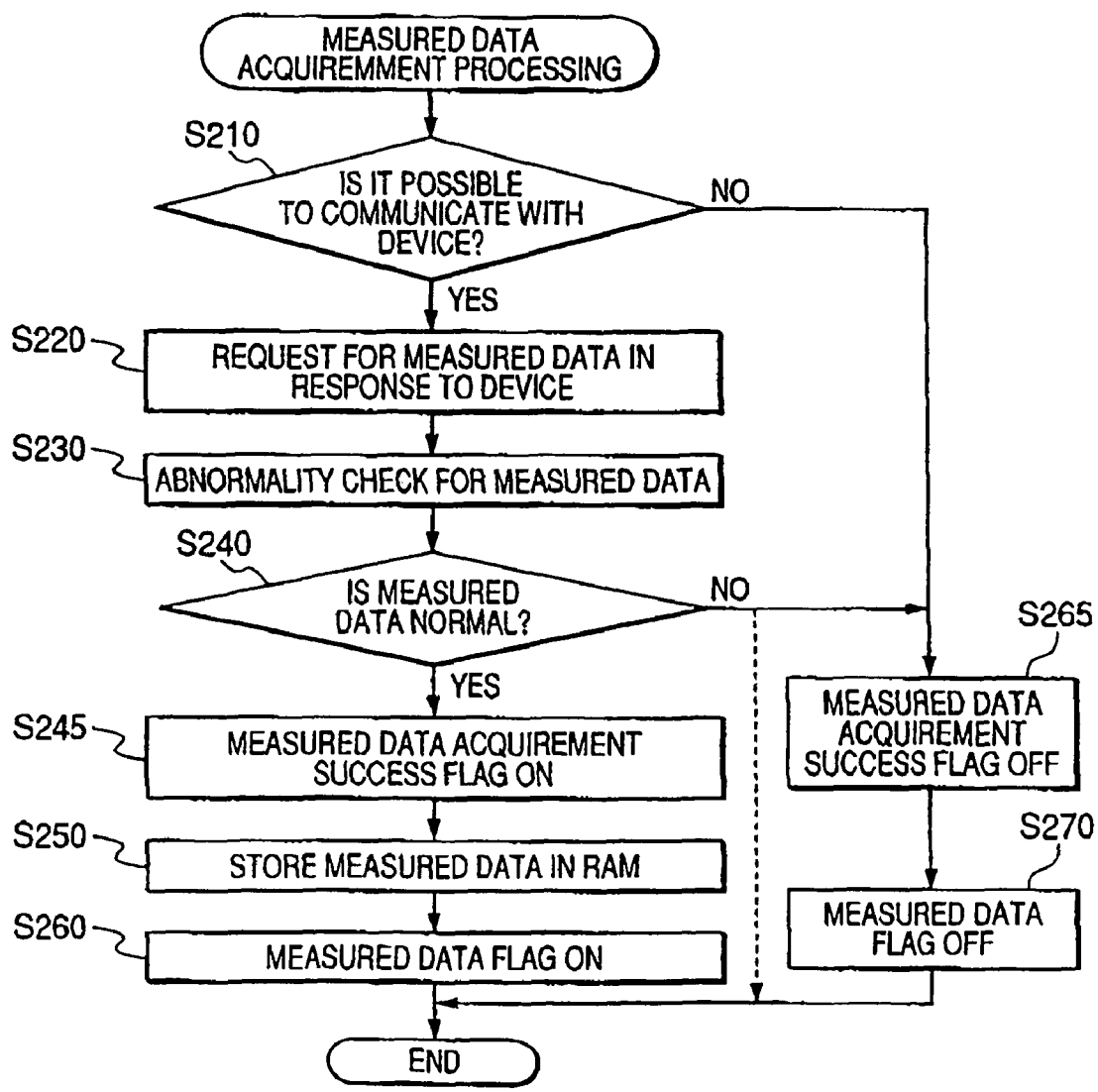

IMAGE DATA PROCESSING SYSTEM, CONTROL APPARATUS, IMAGE CONVERTING PROGRAM AND METHOD

CROSS REFERENCE TO RELATED APPLICATION

This application claims priority from Japanese Patent Application No. 2005-191956, filed Jun. 30, 2005, the contents of which are hereby incorporated by reference into the present application.

TECHNICAL FIELD

Aspects of the present invention relate to an image data processing system, a control apparatus and an image converting program for detecting a state of an image recording apparatus, thereby processing an image data based on a detected result.

BACKGROUND

Conventionally, there has been widely known a system comprising a printing apparatus capable of executing a calibration processing, and a host apparatus transmitting a print job to the printing apparatus.

In the system, when a user inputs an instruction to acquire calibration information before printing processing, the host apparatus acquires the calibration information from the printing apparatus and stores the information in a RAM.

When the user inputs a printing instruction, the host apparatus generates a print job based on the calibration information in the RAM and transmits the print job to the printing apparatus.

However, the host apparatus in the above system is designed to repeat the processing to acquire calibration information until the calibration information is acquired from the printing apparatus. Therefore, when the calibration information cannot be acquired, the printing cannot be performed.

Even though the calibration information can be acquired, the information can be abnormal. In this case, since a print job is generated based on abnormal calibration information, a printing result becomes also abnormal. But the user cannot instantaneously determine whether or not a printing has been performed by using normal calibration information. Therefore, the user is required to confirm all prints by using a visual observation or an apparatus such as color measuring machine or the like. A work for confirming the prints is cumbersome.

These problems are not limited to the case of acquiring calibration information, and can similarly occur in the case of system for acquiring a state of an image recording apparatus, thereby converting an image data based on the acquired result.

Aspects of the present invention provide an image data processing system for detecting a state of an image recording apparatus, thereby processing an image data based on the detected result. A user is notified whether or not a detection result of an apparatus state is normal. The user then executes an image conversion after recognizing whether or not the detection result is normal.

SUMMARY

According to an aspect of the invention, an image data processing system comprises: a first storing unit that previously stores an apparatus information corresponding to an image recording apparatus; a determining unit that determines whether or not the apparatus information stored in the first storing unit is in a predetermined range of values; a notifying unit that notifies whether or not a content of the apparatus information is normal based on a result determined by the determining unit; an instruction acquiring unit that acquires an instruction indicating whether or not an image data is converted by using the apparatus information stored in the first storing unit; a converting unit that converts an image data based on the instruction; and an image data supplying unit that supplies the image data to the image recording apparatus corresponding to the apparatus information.

According to another aspect of the invention, an image data processing system comprises: an apparatus information acquiring unit that acquires an apparatus information from an image recording apparatus; a first storing unit that stores the apparatus information; a determining unit that determines whether or not the apparatus information stored in the first storing unit is normally acquired; a notifying unit that notifies whether or not the apparatus information is normally acquired based on a result determined by the determining unit; an instruction acquiring unit that acquires an instruction to indicate whether or not an image data is converted by using the apparatus information stored in the first storing unit; a converting unit that converts an image data based on the instruction; and an image data supplying unit that supplies the image data to an image recording apparatus corresponding to the apparatus information.

According to still another aspect of the invention, an image data processing system comprises: a requesting unit that requests apparatus information of an image recording apparatus, which comprises an apparatus information supplying unit supplying the apparatus information, when a request of the apparatus information is received; an apparatus information acquiring unit that acquires the apparatus information from the image recording apparatus; a first storing unit that stores the apparatus information acquired by the apparatus information acquiring unit; a notifying unit that notifies a result of the apparatus information acquired by the apparatus information acquiring unit; an instruction acquiring unit that acquires an instruction to show whether or not an image data is converted by using the apparatus information stored in the first storing unit; a converting unit that converts an image data based on the instruction; and an image data supplying unit that supplies the image data to an image recording apparatus corresponding to the apparatus information.

According to yet another aspect of the invention, a control apparatus comprises: a requesting unit that requests apparatus information of an image recording apparatus, which comprises an apparatus information supplying unit supplying the apparatus information, when a request of the apparatus information is received; an apparatus information acquiring unit that acquires the apparatus information from the image recording apparatus; a first storing unit that stores the apparatus information acquired by the apparatus information acquiring unit; a notifying unit that notifies a result of the apparatus information acquired by the apparatus information acquiring unit; an instruction acquiring unit that acquires an instruction to show whether or not an image data is converted by using the apparatus information stored in the first storing unit; a converting unit that converts an image data based on the instruction; and an image data supplying unit that supplies the image data to an image recording apparatus corresponding to the apparatus information.

According to still another aspect of the invention, a computer program product for enabling a computer to convert an image data in an apparatus, which comprises: a communicating unit that communicates to an image recording apparatus to transmit apparatus information to a request source, when a request of the apparatus information representing a self apparatus state is received; and a first storing unit that stores the apparatus information representing the apparatus state of the image recording apparatus, comprises: software instructions for enabling the computer to perform predetermined operations, and a computer readable medium bearing the software instructions; the predetermined operations comprising the steps of: acquiring the apparatus information from the image recording apparatus though the communicating unit; notifying a result of the acquired apparatus information; acquiring an instruction to show whether or not an image data is converted by using the apparatus information stored in the first storing unit; converting an image data based on the instruction; and supplying the image data to an image recording apparatus corresponding to the apparatus information.

BRIEF DESCRIPTION OF DRAWINGS

FIG. 1 is a block diagram showing an image data processing system;

FIG. 2A is a flow chart showing an initialization, and FIG. 2B is a flow chart showing a measured data acquirement from an initialization;

DETAILED DESCRIPTION

General Overview

Figure 3A:
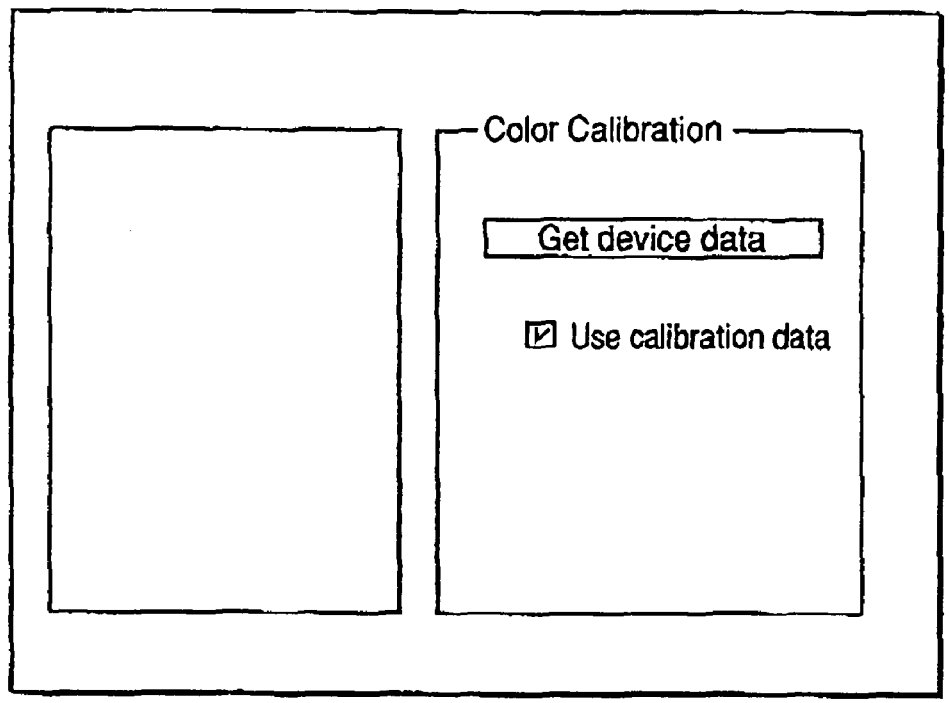
FIG. 3A is an explanatory diagram showing an example of an image displayed on a display unit when a measured data acquirement success flag is set to ON, and FIG. 3B is an explanatory diagram showing an example of an image displayed on a display unit when a measured data acquirement success flag is set to OFF.

That is, in the image data processing system according to any one of above Claims, in case that the apparatus information is abnormal such as in case that the acquired apparatus information has an error or the apparatus information can not be acquired, that fact can be notified to a user.

However, in the image data processing system according to Claim 3, as described in Claim 4, it is preferable that the image data processing system comprises a determining unit that determines whether or not the apparatus information is normally acquired by the apparatus information acquiring unit; a setting unit that sets the converting unit not to convert an image data based on an apparatus information stored in the first storing unit when the converting unit determines that an apparatus information can not be normally acquired.

That is, in the image data processing system, the abnormal apparatus information is set not to be used in case that the apparatus information can not have been normally acquired.

Therefore, according to the image data processing system, the system can prevent a new image data from being the abnormal image data Further, in the image data processing system according certain embodiments of the present invention, it is preferable that the setting unit automatically sets the converting unit to convert an image data based on an apparatus information stored in the first storing unit when the determining unit determines that an apparatus information can be normally acquired, and the converting unit converts an image data based on a setting by the setting unit.

According to the image data processing system, since the setting unit automatically sets the converting unit to perform an image conversion by using the apparatus information when the apparatus information can be normally acquired, a user can save the effort for setting the setting by himself.

Further, in the image data processing system according certain embodiments of the present invention, it is preferable that the system comprises a second storing unit in which reference information is previously stored, the reference information representing a specific apparatus state in the image recording apparatus, wherein the setting unit sets the converting unit to convert an image data based on a reference information stored in the second storing unit when the determining unit determines that an apparatus information can be normally acquired, and the converting unit converts an image data based on the apparatus information stored in the first storing unit or the reference information stored in the second storing unit based on a setting by the setting unit.

According to the image data processing system, since an image data conversion is performed based on the reference information stored in the second storing unit when the apparatus information can be normally acquired, the image data conversion can be performed at all times.

In this case, since the notifying unit notifies the user is of a result of acquiring the apparatus information, the user can easily recognize that the image data conversion is performed by using the reference information.

Further, in the image data processing system according certain embodiments of the present invention, it is preferable that the system comprises an input unit for externally inputting whether the apparatus information stored in the first storing unit is used or the reference information stored in the second storing unit is used by the operation of a user when the image data is converted by the converting unit, wherein the setting unit sets information used when the converting unit converts the image data based on an instruction inputted through the input unit.

According to the image data processing system, the user can select the information (apparatus information or reference information) that the converting unit uses. Therefore, the user can easily recognize if any one of the apparatus information and reference information will be used.

Further, in the image data processing system according to certain embodiments of the present invention, it is preferable that the notifying unit realizes the notification by enabling the input unit to input or not enabling the input unit to input based on a result determined by the determining unit.

According to the image data processing system, in case that the acquired apparatus information is abnormal, since the input unit for externally inputting whether or not the apparatus information will be used cannot be inputted, it can be surely notify to the user when the apparatus information is abnormal. Accordingly, the image conversion using the abnormal apparatus information can be prevented.

Further, in the image data processing system according to certain embodiments of the present invention, it is preferable that the setting unit automatically sets the input unit to convert an image data based on an apparatus information stored in the first storing unit when the determining unit determines that an apparatus information can be acquired, and the converting unit converts an image data based on the apparatus information stored in the first storing unit or the reference information stored in the second storing unit based on a setting by the setting unit.

That is, in the image data processing system, the setting unit automatically sets the image conversion using the apparatus information to be performed in case that the apparatus information can be acquired normally.

Therefore, according to the image data processing system, a user can save the effort for performing the setting that the image conversion using the apparatus information is performed by himself. Further, the normal apparatus information can be acquired, nevertheless the image conversion using the reference information can be prevented.

Further, in the image data processing system according to certain embodiments of the present invention, it is preferable that the apparatus information acquiring unit repeatedly acquires apparatus information in a predetermined timing.

According to the image data processing system, since the image conversion is performed by using a comparatively new apparatus information, a good conversion result can be easily obtained.

Further, in the image data processing system according to certain embodiments of the present invention, it is preferable that the system comprises an acquirement notifying unit which notifies a user of acquiring the apparatus information.

According to the image data processing system, a renewal circumstance of the apparatus information and a acquirement result thereof are can be comprehensively notified to the user.

Further, in the image data processing system according to certain embodiments of the present invention, it is preferable that the image recording apparatus comprises a first communicating unit for communicating between an external apparatus, and is an image forming apparatus for transmitting the apparatus information to the external apparatus which is a request source of information when requests of the apparatus information is received through the first communicating unit so as to form an image based on the acquired image data on a recording medium when the image data is received through the first communicating unit, wherein, the first storing unit, the apparatus information acquiring unit, the notifying unit and the converting unit are comprised in a control apparatus which is an external apparatus comprising a second communicating unit for communicating between the image forming apparatus and a transmitting unit that transmits an image data after conversion by the converting unit to the image forming apparatus through the second communicating unit.

According to the image data processing system, since the image forming apparatus receives an image data converted based on the apparatus information of the image forming apparatus, the printing can be performed without converting the received data. Therefore, the constitution of the image forming apparatus can be simple.

Further, in the image data processing system according to certain embodiments of the present invention, it is preferable that the system comprises a reference color information storing unit that previously stores a reference color information representing a reference color at the time of correcting a color of each pixel constituting an image data, wherein the apparatus information acquiring unit acquires information comprising a calibration information as the apparatus information, and the converting unit calculates a correction value for color correction based on a calibration information stored in the first storing unit and a reference color information stored in the reference color information storing unit, and thereby converts the new image data to a new image data by correcting a color of each pixel of the image data based on the calculated correction value.

According to the image data processing system, since the image data is corrected based on the calibration information and reference color information, the color correction of the image data can be appropriately performed.

Next, a control apparatus according to certain embodiments of the present invention comprises a requesting unit that requests an apparatus information of an image recording apparatus comprising an apparatus information supplying unit supplying an apparatus information when requests of an apparatus information is received; an apparatus information acquiring unit that acquires an apparatus information from the image recording apparatus; a first storing unit that stores an apparatus information acquired by the apparatus information acquiring unit; a notifying unit that notifies a result of an apparatus information acquired by the apparatus information acquiring unit; an instruction acquiring unit that acquires an instruction showing whether or not an image data is converted by using the apparatus information stored in the first storing unit; a converting unit that converts an image data based on the instruction; and an image data supplying unit that supplies the image data to an image recording apparatus corresponding to the apparatus information.

Also, in the control apparatus according to the present invention, similarly to the above mentioned image data processing system, in case that the apparatus information is abnormal such as in case that the acquired apparatus information has an error or the apparatus information can not be acquired, that fact can be notified to a user.

Therefore, according to the control apparatus, a user can execute an image data conversion based on an apparatus information in case that the user recognizes whether or not the image data conversion based on the apparatus information can be performed normally.

Next, the invention according to certain embodiments of the present invention comprises, in an image converting program executable to convert an image data in the apparatus comprising a communicating unit for communicating between an image recording apparatus transmitting apparatus information to a request source when requests of an apparatus information representing a self apparatus state is received and first storing unit for storing an apparatus information representing an apparatus state of the image recording apparatus, an apparatus information acquiring process that acquires the apparatus information from the image recording apparatus through the communicating unit; a notifying process that notifies a result of an apparatus information acquired by the apparatus information acquiring process; an instruction acquiring process that acquires an instruction showing whether or not an image data is converted by using the apparatus information stored in the first storing unit; a converting process that converts an image data based on the instruction; and an image data supplying process that supplies the image data to an image recording apparatus corresponding to the apparatus information.

Also, in the image converting program according to the present invention, similarly to the above mentioned image data processing system or control apparatus, in case that the apparatus information is abnormal such as in case that the acquired apparatus information has an error or the apparatus information can not be acquired, that fact can be notified to a user.

Therefore, according to the image converting program, a user can execute an image data conversion based on an apparatus information in case that the user recognizes whether or not the image data conversion based on the apparatus information can be performed normally.

Hereinafter, illustrative aspects according to an aspect of the invention will be described with reference to drawings.

[First Aspect]

FIG. 1 is a block diagram showing an image data processing system according to an aspect of the invention. As shown in FIG. 1, the image data processing system 1a comprises a host apparatus 10, printer 20a, 40 connected to the host apparatus 10 and a MFP (Multi Function Peripherals) 20b.

The host apparatus 10 comprises, for example, a personal computer and has a function of controlling the printer 20a, 40 and MFP 20b as a control apparatus.

That is, the host apparatus 10 comprises a CPU 11 controlling all the host apparatus 10; a ROM 12 in which a program for operating the CPU 11 is stored; a RAM 13 (a first storing unit) functioning as a work area when a processing by the CPU 11 is executed; a printer port interface (I/F) 14 that can perform a bidirectional communication between the printer 20a, 40 and MFP 20b; and a USB interface 18 (a communicating unit and a second communicating unit). Further, the host apparatus 10 comprises a hard disk drive (HDD) 15 (a second storing unit and a reference color information storing unit) functioning as a large capacity memory area; an operating unit 16 (an input unit), which is operated by a user; a display unit 17, which displays a operating state of a host apparatus 10 or various types of apparatuses connected to the host apparatus 10.

In the host apparatus 10, the CPU 11 controls the host apparatus 10 or the various types of apparatuses connected to the host apparatus 10 based on various types of instructions inputted through the program stored in the ROM 12, the operating unit 16 or each of the interface 14, 18.

A reference data (reference information) representing a specific apparatus state (for example, a prediction of a measured data when these apparatuses perform a predetermined number (500 pages, 1000 pages or the like) of an image forming operation) of the printer 20a, 40 and MFP 20b or a reference color information representing a reference color when correcting a color of each pixel constituting an image data treated by the printer 20a, 40 and MFP 20b is previously stored in the HDD 15.

The printer 20a and MFP 20b comprise CPUs 21a, 21b, ROMs 22a, 22b, RAM 23a, 23b and HDDs 25a, 25b functioning as a known microcomputer, respectively. Further, the printer 20a and MFP 20b comprise operation keys 26a, 26b operated by a user, display panels 27a, 27b displaying an operating state thereof, and non-volatile RAM 28a, 28b in which information such as a setting of the various types of apparatuses is stored, respectively. Further, the printer 20a and MFP 20b comprise printing units 29a, 29b forming an image on a recording medium (for example, a paper or a member inside an apparatus) based on an instruction from the CPUs 21a, 21b, and detecting units 30a, 30b detecting a concentration of an image formed on the recording medium by the printing units 29a, 29b.

The printer 20a comprises a printer port interface 24a to perform a communication between the printer port interface 14 of the host apparatus 10.

On the other hand, the MFP 20b comprises a USB interface 24b (a first communicating unit) to perform a communication between the USB interface 18 of the host apparatus 10. Moreover, the USB interface 24b is connected to the host apparatus 10 through a USB hub 50.

The MFP 20b comprises a modem 31 for communicating with external apparatus through a public line and a scanner 32 (a reading unit) for reading a document placed on a document placing plate (not shown).

Since the print 40 is similar to the printer 20a, the explanation thereof will be omitted.

Here, the printer 20a, 40 and MFP 20b (CPU 21a, 21b) connected to the host apparatus 10 perform a calibration and then store a measured data obtained by this operation in the non-volatile RAM 28a, 28b when a predetermined condition is established (for example, when a power is inputted, a constant number of image forming operations is performed, or an instruction from the host apparatus is received, at intervals of a predetermined time).

The calibration is a known operation. That is, first, the printer 20a, 40 and MFP 20b form plural images on a recording medium by the printing units 29a, 29b, concentration of the plural images being different from each other. Then, the concentration with respect to each of the plural images is measured by the detecting units 30a, 30b. The host apparatus 10 then acquires a measured result or a data (measured data: calibration information) such as a numeric value uniquely determined based on the measured result from the printer 20a, 40 and MFP 20b. Next, by comparing the calibration information with the reference color information stored in the HDD 15, a correction value for correcting the measured color is calculated so as to approximate the actual concentration to the reference color. Further, by interpolating a color, whose concentration is not measured based on a color, whose concentration is measured, a correction value for color correction is calculated. Further, by correcting a color of is each pixel of an image data based on the calculated correction value, the image data is converted to a new image data. Accordingly, the calibration is executed.

The printer 20a, 40 and MFP 20b transmit the measured data stored in the non-volatile RAM 28a, 28b to an external apparatus (host apparatus 10) when a request of the measured data from the host apparatus is received or the predetermined condition is established.

The processing, which is executed in the host apparatus 10, when a setting of the printer 20a, 40 and MFP 20b is performed will be described with reference to FIGS. 2A and 2B. FIG. 2A is a flow chart showing an initialization executed by the CPU 11 of the host apparatus 10, and FIG. 2B is a flow chart showing a measured data acquirement in the initialization. Incidentally, in the initialization, the processing of S120 functions as a notifying unit a notifying process. Further, the processing of S220 functions as a request unit and an apparatus information acquiring unit. The processing of S230 and S240 function as a determining unit.

In the initialization, for example, in the processing initiated when an instruction for acquiring a measured data is inputted with respect to a specific device (here, any one of the printer 20a, 40 and MFP 20b) through a operating unit 16 by a user (for example, when the CPU 11 displays an image shown in FIG. 3A on the display unit 17, and thereby "Get device data" is selected by the user), first, the measured data acquirement is executed in S110.

In the measured data acquirement of S110, as shown in FIG. 2B, first, determination is made on whether or not it is possible to communicate with a specific device, which is required to acquire the measured data in S210. Specifically, it determines whether or not the specific device to which power is inputted is connected to each interface.

In S210, when it is possible to communicate with the specific device, the control proceeds to S220, and when it is not possible to communicate with the specific device, the control proceeds to S265.

In S220, the measured data is requested to the specific device, which is required to acquire the measured data, and the measured data is received (acquired) from the device.

In S230, it is determined whether or not the measured data received is abnormal. Here, measurement data being abnormal refers to a case where the measured data is not received in S220 (for example, in a case where the measured data is not received within a predetermined time from a request of the measured data); a case where the number of data supposed to be comprised in the measured data is insufficient; a case where specified character string is not comprised in the measured data; or a case where a magnitude relation of each data comprised in the measured data is abnormal (for example, when data representing that concentration is high is supposed to be obtained, but data representing that concentration is low is obtained).

In S240, it is determined whether or not the measured data, which is acquired, is abnormal. When the measured data is normal, the control proceeds to S245, and when the measured data is abnormal, the control proceeds to S265.

In S245, a measured data acquirement success flag in the RAM 13 is set to ON, and the control proceeds to S250.

In S250, the measured data, which is acquired, is stored in the RAM 13, and the control proceeds to S260.

In S260, a measured data flag in the RAM 13 is set to ON, and the measured data acquirement ends.

On the other hand, in S265, the measured data acquirement success flag in the RAM 13 is set to OFF, and the control proceeds to S270.

In S270, the measured data flag in the RAM 13 is set to OFF, and the measured data acquirement ends.

When the measured data acquirement ends, the control proceeds to S120 of the initialization shown in FIG. 2A.

In S120, an acquirement result of the measured data is displayed on the display unit 17 based on the measured data acquirement success flag stored in the RAM 13, and then the initialization ends.

Figure 3B:
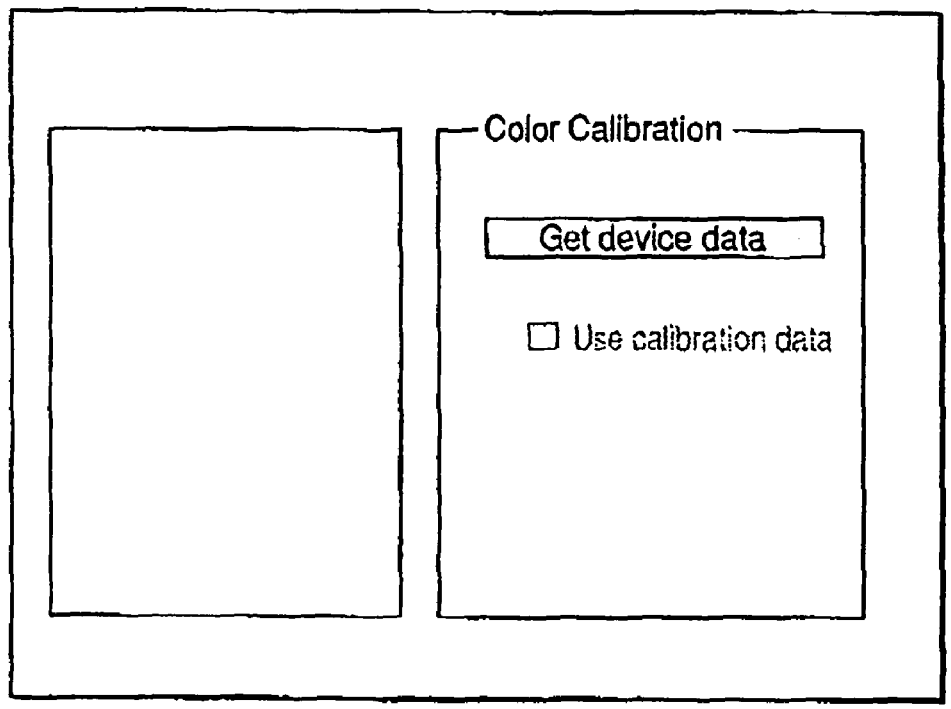

FIGS. 3A and 3B show a display example of an image, which is displayed on the display unit 17 by the CPU 11 in S120 of the initialization. FIG. 3A is an explanatory diagram showing an example of an image displayed on the display unit when the measured data acquirement success flag is set to ON, and FIG. 3B is an explanatory diagram showing an example of an image displayed on the display unit when the measured data acquirement success flag is set to OFF.

As shown in FIG. 3A, when the measured data acquirement success flag is set to ON, the message "Use calibration data" and a check column located at left side thereof are displayed on the display unit 17 with ordinary characters (bold characters). In this case, when the measured data flag is set to ON, it is displayed on the display unit 17 in a state that a check "√" is put in the check column. That is, the user does not need to input the check "√". Further, the user can remove this check "√" by operating the operating unit 16. Accordingly, in a case where the check "√" is removed on the display unit 17 by the user, the measured data flag in the RAM 13 is set to OFF.

When the measured data acquirement success flag is set to ON, the system enables the user to select whether or not the measured data acquired by the initialization will be used when a print data creation processing described below is performed.

On the other hand, when the measured data acquirement success flag is set to OFF, since the measured data flag is always set to OFF, it is displayed on the display unit 17 in a state that a check "√" is not put in the check column.

In this case, the message "Use calibration data" and check column are displayed with more pale characters than when the measured data acquirement success flag is set to ON, and the user cannot set whether or not the measured data will be used. In other words, in this processing, it is selectively displayed whether or not the measured data will be used when a print data creation processing described below is performed on the display unit 17 only when the measured data acquirement success flag is set to ON. Also, whether the measured data has been acquired is notified to the user by displaying the message "Use calibration data" by the ordinary characters or pale characters.

The processing when printing is performed by using any one of the printer 20a, 40 and MFP 20b will be described with reference to FIG. 4.

Figure 4:
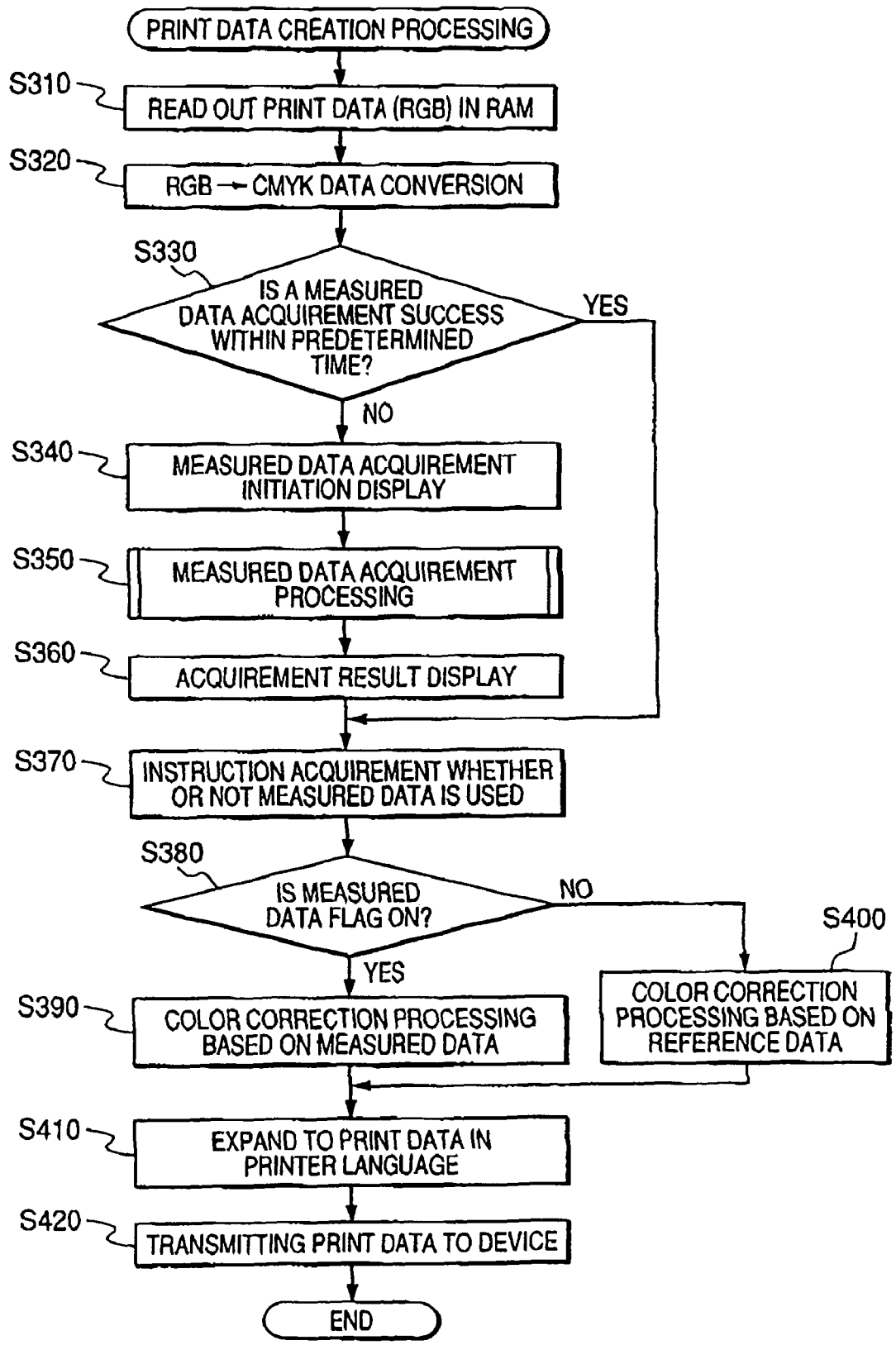
FIG. 4 is a flow chart showing a print data creation processing according to a first illustrative aspect.

FIG. 4 is a flow chart showing a print data creation processing executed by the CPU 11 of the host apparatus 10. Moreover, in the print data creation processing, the processing of S340 corresponds to an acquirement notifying unit, and the processing of S360 corresponds to a notifying unit and a notifying process. Further, the processing of S370 corresponds to an instruction acquiring unit, and the processing of S380 corresponds to a setting unit. Further, the processing of S390 to S410 function as a converting unit, and the processing of S3420 corresponds to an image data supplying unit and a transmitting unit.

This print data creation processing, for example, is a processing initiated when a printing instruction, which has designated an image data to be printed by a user through an operating unit 16 is put. First, in S310, the data, which is required to be printed is read out in RAM 13. Here, a reading is performed with data RGB-notated in the RAM 13.

In S320, and a RGB data is converted to a CMYK data generally treated in the printer 20a, 40 and MFP 20b. Moreover, this processing is executed by using a known mathematical formula.

In S330, and it is determined whether or not a constant time is passed after the measured data is successfully acquired from a printer, which is required to print this data. When the constant time is passed, the control proceeds to S340, and when the constant time is not passed, the control proceeds to S370.

In S340, the fact that the acquirement of the measured data is initiated is displayed on the display unit 17, and the control proceeds to S350. Next, in S350 and S360, the processing similar to S110 of the initialization and the processing of S120 is performed. When these processing are ended, the control proceeds to S370.

In S370, the instruction (that is, the measured data flag) whether or not the measured data will be used is acquired, and the control proceeds to S380.

In S380, it is determined whether or not the measured data flag is set to ON. When the measured data flag is set to ON, the control proceeds to S390, and when the measured data flag is set to OFF, the control proceeds to S400.

In S390, this data in a print data is color-corrected for each pixel by using the measured data stored in RAM 13, and then the control proceeds to S400.

On the other hand, in S400, this data in the print data is color-corrected for each pixel by using a reference data stored in HDD 15, and then the control proceeds to S410.

In S400, the color-corrected data is expanded to a print data in response to a printer language corresponding to a device, which is used, and then the control proceeds to S420. Next, in S420, the expanded print data is transmitted to the device, and then the print data creation processing ends.

In the image data processing system 1a described above, the host apparatus comprises a RAM 13 storing the measured data corresponding to the printer 20a, 40 and MFP 20b. The host apparatus, in the initialization, requests the measured data to an apparatus information supplying unit supplying the measured data when a request of the measured data is received, acquires the measured data from the printer 20a, 40 and MFP 20b, and then stores this measured data in the RAM 13. Next, the host apparatus determines whether or not the measured data stored in the RAM 13 is a predetermined range of values and whether or not the measured data is normally acquired, and notifies whether or not the measured data is normally acquired (whether or not contents thereof is right) based on a determination result by a determining unit. Further, the host apparatus 10 (CPU 11) acquires an instruction indicating whether or not an image data will be converted by using the measured data stored in the RAM 13, converts the image data based on the instruction, and supplies the image data to the printer 20a, 40 and MFP 20b corresponding to the measured data.

In the image data processing system 1a described above, in a case where the measured data is abnormal such as in a case where an error is in the measured data, which is acquired or in a case where this measured data has been unable to be acquired, the system can notify the fact to the user.

According to this image data processing system, an image data conversion can be implemented based on the measured data in a state that the user recognizes whether or not the image data conversion can be normally performed based on the measured data.

In the image data processing system 1a described above, in the print data creation processing, the system is set not to convert the image data based on the measured data stored in the RAM 13 in a case where it is determined that the measured data has been unable to be normally acquired.

In this image data processing system, in a case where the measured data has been unable to be normally acquired, the system is set not to use the abnormal measured data.

According to this image data processing system, the system can prevent a new image data from being converted to the abnormal measured data.

In the image data processing system 1a, in the print data creation processing, the system is automatically set to convert the image data based on the measured data stored in the RAM 13 in a case where it is determined that the measured data has been able to be normally acquired, and then converts the image data based on the setting.

According to this image data processing system, in a case where the measured data has been able to be normally acquired, since the system is automatically set to convert the image data by using the measured data, the user can save a effort that the setting is performed by himself.

In the image data processing system 1a, the host apparatus 10 comprises a HDD 15 in which a reference data representing a specific apparatus state in the printer 20a, 40 and MFP 20b is previously stored. In the print data creation processing, the host apparatus sets the image data to be convert based on the reference data stored in the HDD 15 in a case where the measured data has been unable to be normally acquired, and converts the image data based on the measured data stored in the RAM 13 or the reference data stored in the HDD 15 by using the setting.

According to this image data processing system 1a, since the system performs the image data conversion based on the reference data stored in the HDD 15, the system can always perform the image data conversion.

In this case, since the acquirement result of the measured data is notified to a user, the user can easily recognize that the conversion of the image data is performed by using the reference.

In the image data processing system 1a, the host apparatus 10 comprises an operating unit 16 for externally inputting when the measure data stored in the RAM 13 will be used or when the reference data stored in the HDD 15 will be used when the image data is converted in the print data creation processing. The host apparatus 10 sets information used when the conversion of the image data is performed based on an instruction inputted through the operating unit 16 in the print data creation processing.

According to this image data processing system 1a, the information (measured information or reference information) used for the image conversion by the user can be selected. Accordingly, the user can easily recognize that any one of the measured information or the reference information will be used.

In the image data processing system 1a, the system realizes the notification by enabling the operating unit 16 to input or not, based on a result determined whether or not the measured data has been able to be normally received.

According to this image data processing system, the operating unit 16 for externally inputting whether or not the measured data will be used cannot be put in a case where the acquired measured data is abnormal. It can surely notify to the user when the measured data has been abnormal. Accordingly, the image conversion by using an abnormal measured data can be prevented.

In the image data processing system, in the print data creation processing, the system automatically set (automatically set in a state that a check "√" is put in the check column) the operating unit 16 to convert the image data based on the measured data stored in the RAM 13 in a case where it is determined that the measured data has been able to be normally acquired, and then converts the image data based on the measured data stored in the RAM 13 or the reference data stored in the HDD 15 by the setting.

In the image data processing system 1a, the system is automatically set to perform an image conversion by using the measured data in a case where the measured data has been able to be acquired. According to this image data processing system 1a, the user can save an effort that the setting by using the measured data is performed to convert the image by himself. Further, the image conversion by using the reference data even though the abnormal measured data has been acquired can be prevented.

In the image data processing system 1a, the fact that the measured data will be acquired is notified to the user when the measured data is acquired again in the print data creation processing.

According to this image data processing system 1a, a renewal circumstance and an acquirement result of the measured data can be comprehensibly notified to the user.

In the image data processing system 1a, the printer 20a, 40 and MFP 20b comprises a printer port interface 24a (USB interface 24b) for communicating with an external apparatus (host apparatus). The printer and MFP transmit the measured data to the external apparatus (host apparatus), which is a request source, when the request of the measured data is received through this printer port interface 24a (USB interface 24b). The printer and MFP form an image based on the image data acquired on a recording medium, when the image data is received through this printer port interface 24a (USB interface 24b). The initialization and print data creation processing are executed at host apparatus side.

According to this image data processing system 1a, since the image forming apparatus receives an image data converted based on the measured data of the image forming apparatus, the printing can be performed without converting the received data. Accordingly, a structure of the image forming apparatus is simplified.

In the image data processing system 1a, reference color information representing a color, which becomes a reference when correcting a color of each pixel in an image data, is stored in HDD 15. The host apparatus 10 acquires information comprising calibration information as the measured data. Further, the host apparatus 10 calculates a correction value for color correction based on the calibration information stored in RAM 13 and reference color information stored in a reference color information storing unit. The image data is converted to a new image data by correcting a color of each pixel in the image data based on the correction value calculating the image data.

According to this image data processing system, since the image data is corrected based on the calibration information and the reference color information, the color correction of the image data can be appropriately performed.

[Second Aspect]

Next, an image data processing system 1b according to another aspect of the invention will be described. Since the image data processing system 1b described in this illustrative aspect (the second illustrative aspect) is partially different from the print data creation processing, an image data processing system 1a, in the first illustrative aspect. Accordingly, in this illustrative aspect (the second illustrative aspect), only the section different from the image data processing system 1a of the first illustrative aspect is specifically described and the description of the same section as the image data processing system 1a of the first illustrative aspect is omitted by putting the same reference numeral on the section.

Figure 5:
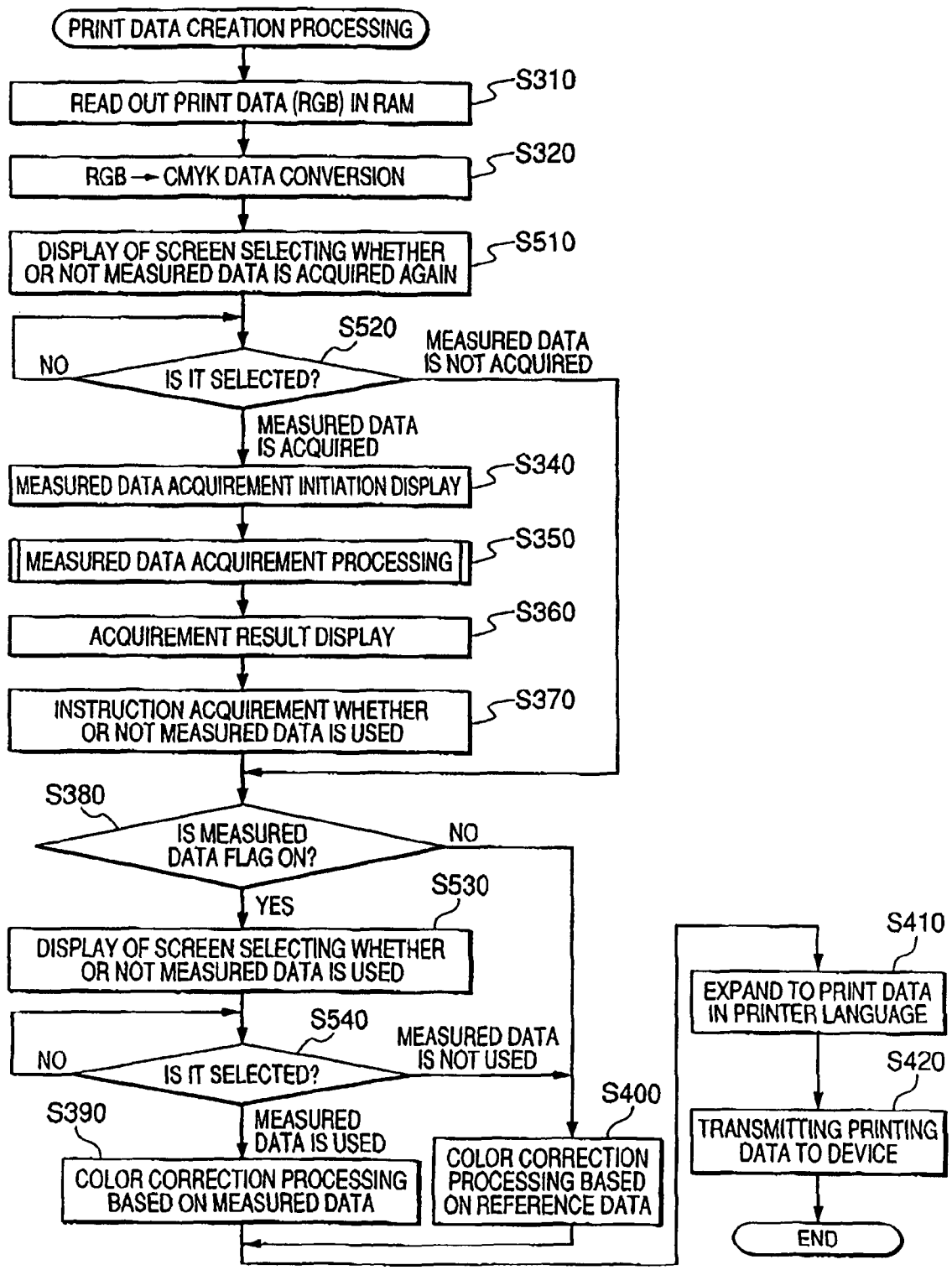
FIG. 5 is a flow chart showing a print data creation processing according to a second illustrative aspect.

The print data creation processing of the illustrative aspect is described by using FIG. 5. FIG. 5 is a flow chart showing the print data processing that a CPU 11 of a host apparatus 10 (a control apparatus) executes. Moreover, the processing of S540 functions as a setting unit.

The processing of S530 and S540 is added while the processing of S510 and S520 is performed by changing the print data creation processing of the illustrative aspect into the processing of S330 in the print data creation processing of the illustrative aspect.

In the print data creation processing of the illustrative aspect, when the processing of S320 ends, S510 is executed. An image for allowing a user to select whether to re-acquire the measured data is displayed on a display unit 17.

In S520 to determine whether or not an instruction is put through an operating unit 16 by the user. When the instruction is not put through the operating unit 16, repeat S520 and when the instruction that the measured data is not re-acquired through the operating unit 16 is put, the control proceeds to S380.

In S380, when the measured data flag is set to ON when whether or not the measured data flag is set to ON is determined, the control proceeds to S530. In S530, an image for allowing the user to select whether or not the measured data acquired is used is displayed on the display unit 17.

In S540 to determine whether or not an instruction is put through the operating unit 16 by the user. When the instruction is not put through the operating unit 16, repeat S540, the instruction that the measure data is used through the operating unit 16, the control proceeds to S390, and when the instruction that the measured data is not used through the operating unit 16 is input, the control proceeds to S400.

The image data processing system 1b has the same effect as the image data processing system 1a of the illustrative aspect. Moreover, a various types of illustrative aspects can be adopted in a case where the illustrative aspect according to aspects of the invention is not limited to any one of the illustrative aspects, but is involved in the technical field.

For example, in each above-referenced illustrative aspect, though the initialization shown in FIGS. 2A and 2B is set to begin when the instruction for acquiring the measured data is put, for example, the processing may be executed periodically or when each device stores the measured data in non-volatile RAMs 28a and 28b. By this configuration, since the conversion of the image data is performed by the comparatively new data measured, the excellent result can be easily acquired. Moreover, in this case, the processing of S330 (S510) to S360 is not required.

When the measured data acquirement after the second step is performed, when the measured data acquired is not normal in the processing of S240, the system may end the measured data acquirement without proceeding to S265.

In this case, when the measured data acquirement after the second step is performed, since the measured data acquirement success flag and measure data flag are set to OFF, the print data creation processing may be performed by using the data measured in the past in a case where the acquirement of the measured data is succeeded in the past.

In this illustrative aspect, various processing that the host apparatus 10 performs is performed not only in a case where a printer or an MFP is connected to the host apparatus 10, the processing can be applied but also in a case where the image recording apparatus, which forms and prints the character data, image data or figure data, which created by a computer such as a fax in recording medium such as papers or OHP sheets.

Further, a variety of processing that the host apparatus 10 is performed not only in a case where the calibration information as an apparatus information is acquired, the processing can be applied but also to the system that converts the image data based on the acquired result by acquiring the state of the image recording apparatus.

Further, the function of the host apparatus 10 may be built-in within the image recording apparatus, and the image recording apparatus in this case can have the same effect as the image recording apparatus in this illustrative aspect when a various types of processing that the host apparatus 10 performs are realized.

In the above-referenced illustrative aspect, whether or not the measure data is acquired is notified to the user by determining whether or not the character of "use calibration data" is represented in pale character, and in addition, by displaying the message (text) indicating whether or not to succeed in acquiring the apparatus information (the measured data) on the display unit 17. Then, when the message indicating the success in acquiring the apparatus information is displayed, the indication (shown in FIGS. 3A and 3B) showing whether or not the printing processing is performed by using the apparatus information is displayed on the display unit to allow the user to select whether or not to use the apparatus information.

As shown above, the acquirement result of the apparatus information is definitely notified. In case of the print data creation processing, whether or not a predetermined time has passed since the acquirement of the previously measured data may be determined in S330, and in addition, whether or not printing a predetermined number of sheets has been performed may be determined.

What is claimed is:

1. An image data processing system comprising:
a requesting unit that requests apparatus information of an image recording apparatus, which comprises an apparatus information supplying unit supplying the apparatus information, when a request of the apparatus information is received;
an apparatus information acquiring unit that acquires the apparatus information from the image recording apparatus;

a first storing unit that stores the apparatus information acquired by the apparatus information acquiring unit;

a displaying unit that displays a result of the apparatus information acquired by the apparatus information acquiring unit;

an instruction acquiring unit that acquires an instruction to show whether or not image data is converted by using the apparatus information stored in the first storing unit;

a converting unit that converts the image data based on the instruction;

an image data supplying unit that supplies the image data to an image recording apparatus corresponding to the apparatus information;

a determining unit that determines whether or not the apparatus information acquired by the apparatus information acquiring unit is normal data;

a setting unit that sets the converting unit to convert the image data based on the apparatus information when the determining unit determines that the acquired apparatus information is normal data, and sets the converting unit to not convert the image data based on the apparatus information when the determining unit determines that the acquired apparatus information is not normal data;

a display controlling unit that controls the displaying unit to display an operation display when the determining unit determines that the acquired apparatus information is not normal data; and an input-operation acquiring control unit that controls an input-operation unit to acquire an input operation using the operation display when the determining unit determines that the acquired apparatus information is not normal data, wherein the apparatus information acquiring unit is controlled to again acquire the apparatus information from the image recording apparatus, which is a source of the apparatus information that is determined not to be normal data, when the determining unit determines that the acquired apparatus information is not normal and the input-operation unit acquires the input operation using the operation display.

2. The image data processing system according to claim 1, wherein
the setting unit automatically sets the converting unit to convert the image data based on the apparatus information stored in the first storing unit when the determining unit determines that the acquired apparatus information is normal data, and
the converting unit converts the image data based on a setting by the setting unit.

3. The image data processing system according to claim 1, further comprising:
a second storing unit that previously stores reference, which represents a specific apparatus state in the image recording apparatus, wherein
the setting unit sets the converting unit to convert the image data based on the reference information stored in the second storing unit when the determining unit determines that an acquired apparatus information is not normal data, and
the converting unit converts the image data based on the apparatus information stored in the first storing unit or the reference information stored in the second storing unit based on a setting by the setting unit.

4. The image data processing system according to claim 3, further comprising:
an input acquiring unit that acquires an instruction whether the apparatus information stored in the first storing unit is used or the reference information stored in the second storing unit is used, wherein
the setting unit sets information which is used based on an instruction inputted through the input unit,
the converting unit converts the image data based on the information which is used.

5. The image data processing system according to claim 4, wherein
the displaying unit enables the input acquiring unit to input or does not enable the input acquiring unit to input based on a result determined by the determining unit.

6. The image data processing system according to claim 4, wherein
the setting unit automatically sets the input unit to convert the image data based on the apparatus information stored in the first storing unit when the determining unit determines that the apparatus information is acquired, and
the converting unit converts the image data based on the apparatus information stored in the first storing unit or the reference information stored in the second storing unit based on a setting by the setting unit.

7. A control apparatus comprising:
a requesting unit that requests apparatus information of an image recording apparatus, which comprises an apparatus information supplying unit supplying the apparatus information, when a request of the apparatus information is received;

an apparatus information acquiring unit that acquires the apparatus information from the image recording apparatus;

a first storing unit that stores the apparatus information acquired by the apparatus information acquiring unit;

a displaying unit that displays a result of the apparatus information acquired by the apparatus information acquiring unit;

an instruction acquiring unit that acquires an instruction to show whether or not image data is converted by using the apparatus information stored in the first storing unit;

a converting unit that converts the image data based on the instruction;

an image data supplying unit that supplies the image data to an image recording apparatus corresponding to the apparatus information;

a determining unit that determines whether or not the apparatus information acquired by the apparatus information acquiring unit is normal data;

a setting unit that sets the converting unit to convert the image data based on the apparatus information when the determining unit determines that the acquired apparatus information is normal data, and sets the converting unit to not convert the image data based on the apparatus information when the determining unit determines that the acquired apparatus information is not normal data;

a display controlling unit that controls the displaying unit to display an operation display when the determining unit determines that the acquired apparatus information is not normal data; and an input-operation acquiring control unit that controls an input-operation unit to acquire an input operation using the operation display when the determining unit determines that the acquired apparatus information is not normal data, wherein the apparatus information acquiring unit is controlled to again acquire the apparatus information from the image recording apparatus, which is a source of the apparatus information that is determined not to be normal data, when the determining unit determines that the acquired apparatus information is not normal and the input-operation unit acquires the input operation using the operation display.

8. A non-transitory computer readable storage medium for enabling a host apparatus to convert image data, wherein the host apparatus comprises:
a communicating unit that communicates to an image recording apparatus to transmit apparatus information to a request source after a request of the apparatus information representing a self apparatus state is received;
a first storing unit that stores the apparatus information representing the apparatus state of the image recording apparatus; and
the computer readable storage medium provides software instructions that enable the host apparatus to perform predetermined operations comprising the steps of:
acquiring the apparatus information from the image recording apparatus though the communicating unit;
determining whether or not the acquired apparatus information is normal data;
displaying an operation display with a displaying unit when the acquired apparatus information is not normal data;
acquiring an input operation using the operation display when the acquired apparatus information is not normal data;
again acquiring the apparatus information from the image recording apparatus though the communicating unit when the determining unit determines that the acquired apparatus information is not normal and the input-operation unit acquires the input operation using the operation display;
acquiring an instruction to show whether or not the image data is to be converted by using the apparatus information stored in the first storing unit;
converting the image data based on the instruction; and
supplying the image data to an image recording apparatus corresponding to the apparatus information,
wherein the instruction is to convert the image data using the apparatus information stored in the first storing unit when the determining unit determines that the acquired apparatus information is normal, and is not to convert the image data using the apparatus information stored in the first storing unit when the determining unit determines that the acquired apparatus information is not normal.

9. An image data processing method comprising:
requesting apparatus information of an image recording apparatus, which comprises an apparatus information supplying unit supplying the apparatus information, when a request of the apparatus information is received;
acquiring the apparatus information from the image recording apparatus;
storing the apparatus information;
determining whether or not the acquired apparatus information is normal data;
displaying and operation display with a displaying unit when the acquired apparatus information is not normal data;
acquiring an input operation using the operation display when the acquired apparatus information is not normal data;
again acquiring the apparatus information from the image recording apparatus when the determining unit determines that the acquired apparatus information is not normal and the input-operation unit acquires the input operation using the operation display;
acquiring an instruction to show whether or not the image data is to be converted by using the apparatus information;
converting the image data based on the instruction; and
supplying the image data to an image recording apparatus corresponding to the apparatus information,
wherein the instruction is to convert the image data using the apparatus information stored in the first storing unit when the determining unit determines that the acquired apparatus information is normal, and is not to convert the image data using the apparatus information stored in the first storing unit when the determining unit determines that the acquired apparatus information is not normal.

10. An image data processing system comprising:
a first storing unit that previously stores apparatus information corresponding to a state of an image recording apparatus;
a determining unit that determines whether or not the apparatus information stored in the first storing unit is normal data;
a displaying unit that displays an operation display based on the determination by the determining unit that the apparatus information is not normal data;
an instruction acquiring unit that acquires an instruction indicating whether or not image data is converted by using the apparatus information stored in the first storing unit;
a converting unit that converts an image data based on the instruction;
an image data supplying unit that supplies the image data to the image recording apparatus corresponding to the apparatus information;
a setting unit that sets the converting unit to convert the image data based on the apparatus information when the determining unit determines that the acquired apparatus information is normal data, and sets the converting unit to not convert the image data based on the apparatus information when the determining unit determines that the acquired apparatus information is not normal data; and
an input-operation acquiring control unit that controls an input-operation unit to acquire an input operation using the operation display when the determining unit determines that the acquired apparatus information is not normal data,
wherein the apparatus information acquiring unit is controlled to again acquire the apparatus information from the image recording apparatus, which is a source of the apparatus information that is determined not to be normal data, when the determining unit determines that the acquired apparatus information is not normal and the input-operation unit acquires the input operation using the operation display.

* * * * *